United States Patent Office 3,793,355
Patented Feb. 19, 1974

3,793,355
COMPOUNDS OF RUTHENIUM
Geoffrey Wilkinson, London, England, assignor to Johnson, Matthey & Co. Limited, London, England
No Drawing. Filed Aug. 8, 1972, Ser. No. 278,804
Claims priority, application Great Britain, Aug. 11, 1971, 37,705/71
Int. Cl. C07f *15/00*
U.S. Cl. 260—429 R      7 Claims

ABSTRACT OF THE DISCLOSURE

This invention relates to a composition of matter having the general formula $$M^1M^2M^3XAn_6L^1L^2L^3$$

where $M^1$, $M^2$ and $M^3$ are the same or different transition metals selected from the second or third series of the Periodic Table; X is oxygen, sulphur, nitrogen, phosphorus or boron; An is anionic element or group and $L^1$, $L^2$ or $L^3$ are neutral or anionic ligands.

---

This invention relates to compounds of the second and third transition series of metals, that is Y—Cd and La—Hg. More particularly the invention relates to compounds of those second and third transition series metals which are members of the platinum group, that is, the members of the second and third transition series in Group VIII of the Periodic Table. The invention is particularly concerned with oxotriruthenium carboxylate complexes and compounds which may be obtained therefrom.

According to one aspect of the present invention, a new composition of matter comprises a complex compound, cation or anion of the general formula:

$$M^1M^2M^3XAn_6L^1L^2L^3$$

Where $M^1$, $M^2$ and $M^3$ are the same or different and one or more are transition metals of the second and third series, and preferably platinum group metals; where $M^1$, $M^2$ and $M^3$ are the same, their formal oxidation states need not be the same, for example, $M^1$ may have a formal oxidation state of $+3$ whereas $M^2$ and $M^3$ (atoms of the same metal) may have formal oxidation states of $+2$, other combinations are also possible); X is oxygen, sulphur, nitrogen, phosphorus or boron, preferably oxygen (X may not be N when $M^1$, $M^2$ and $M^3$ are all Ir); An is anionic element or group such as carboxylate, diethyl-dithio-carbamate ($S_2CNEt_2$) or sulphate (a preferred carboxylate is acetate), $L^1$, $L^2$ or $L^3$, if present may be the same or different, and neutral or anionic ligand species such as $H_2O$, pyridine (py), $OH^-$, triphenylphosphine ($PPh_3$) CO, etc.

One preferred embodiment of the present invention is a complex compound, cation or anion of the general formula:

$$[Ru_3O(OCOR)_6L_3]$$

which is an embodiment of the General Formula $$M^1M^2M^3XAn_6L_3$$

and in which An is carboxylate of General Formula OCOR (e.g. acetate) and L is $H_2O$, py or $PPh_3$.

The group OCOR represents a generalized carboxylate radical in which R is an aryl or alkyl or substituted aryl or alkyl group. A preferred carboxylate is acetate, in which R=$CH_3$.

The three ruthenium atoms may be in a formally $+2$ or $+3$ oxidation state and we believe are at the corners of a triangle with oxygen at its center. The three ruthenium atoms present in complexes according to the present invention may be present as:

$$[ORu_3^{III,III,III}]^{7+}$$
$$[ORu_3^{III,III,II}]^{6+}$$
$$[ORu_3^{III,II,II}]^{5+}$$

and with six monovalent anions may therefore form a monovalent cationic species, a neutral species or a monovalent anionic species respectively.

Preferred embodiments of the present invention are, therefore:

$$[Ru_3O(OCOCH_3)_6(H_2O)_3]^+$$
$$Ru_3O(OCOCH_3)_6(H_2O)_3$$
$$[Ru_3O(OCOCH_3)_6(H_2O)_3]^-$$
$$[Ru_3O(OCOCH_3)_6(PPh_3)_3]^+$$
$$Ru_3O(OCOCH_3)_6(PPh_3)_3$$
$$[Ru_3O(OCOCH_3)_6(PPh_3)_3]^-$$

In each of the above, water or triphenylphosphine might be replaced by other ligands, e.g. pyridine or methyl pyridine.

Compositions according to the present invention may also be in the form of salts derived from the above-described cations and anions.

Compositions according to the present invention may be used in electrodeposition especially of ruthenium, for homogeneous catalysis, in aqueous or other fluid media. The compositions may also be used in the impregnation of substrates for the production of heterogeneous catalysts and using the methods described in Pat. No. 1,116,943.

The compositions are useful for the catalysts of acidbase reactions and for the catalysis of reduction, oxidation, hydrogenation, hydroformylation, carbonylation, isomerization reactions.

By the interaction of commercial hydrated ruthenium trichloride with acetic acid, acetic anhydride mixtures, the complex $[Ru_2(CO_2Me)_4]Cl$ may be obtained; other carboxylates may be prepared similarly. X-ray crystallography confirms a suggested tetra acetate bridge binuclear structure and shows that $[Ru_2(CO_2Me)_4]^+$ units are linked into chains by Ru-Cl-Ru bridges. The complex has equivalent ruthenium atoms in the mean oxidation state of $+2.5$ or, as originally formulated, II, III.

The above reaction gives not only $[Ru_2(CO_2Me)_4]Cl$, but a green solution and it was thought that the latter might contain the corresponding neutral dimer. Using somewhat different, conditions, namely the interaction of ruthenium chloride, acetic acid and sodium acetate in ethanol, a green impure material was isolated. This was shown to form adducts with pyridine and triphenylphosphine, which were formulated as adducts of the dimer by analogy with the well-known adducts of the dimeric tetrabridged acetates of $Cr^{II}$, $Cu^{II}$ and $Rh^{II}$.

In further studies of these materials we have now found that the green acetate is not $Ru_2(CO_2Me)_4$ bu an oxo-centered ruthenium (III) basic acetate complex. Molecular weight determinations also indicated that the $PPh_3$ adduct was a trimer and the oxo-centered structure of the latter was proved by X-ray crystallographic study. Hence this complex is $Ru_3O(CO_2Me)_6(PPh_3)_3$, with identical ruthenium atoms in a mean oxidation state of $+2\frac{2}{3}$— or less correctly using the stock nomenclature with $Ru^{II}$, $Ru^{III}$, $Ru^{III}$.

All of the previously known oxo-centered species have the metal atom in the $+3$ state; the ruthenium acetate system provides the first example of an oxo acetate of a second or third row element in the Periodic Table (long form) and also of reversible redox reactions.

(A) THE $\mu_3$-OXOTRIRUTHENIUM (III) CARBOXYLATES

(1) Synthesis of oxo carboxylates

The acetate is prepared as described above in an impure state; the use of an inert atmosphere is not necessary, and a reflux time of one hour is sufficient. The crude product contains a considerable excess of sodium acetate, from which it can be separated by a number of techniques. A preliminary purification is readily achieved by dialysis in water using a cellophane membrane (Visking tubing) and the pure acetate has been obtained by chromatography on Sephade (grade G10). It is best purified, however, by recrystallization from methanol-acetone, from which it separates as a green powder. Analysis supports the stoichiometry $[Ru_3O(CO_2Me)_6(H_2O)_3]CO_2Me$. The complex is paramagnetic with $\mu_{eff}=1.77$ B.M. at 298° K. in the solid state (Gouy method). This is consistent with an $Ru^{III}{}_3O$ unit, in which marked spin-spin interaction would be expected, via the central oxygen atom.

The complex as formulated would be a unipositive cation, but in protonic solvents, ionization of the aquo ligands may occur. High voltage paper electrophoresis experiments show that in acidic buffers (pH 2) acetate oxotriruthenium(III) migrates as a cation, and in alkaline-buffers (pH 9), as an anion, the rates of migration in the two cases being equal. In unbuffered dilute potassium chloride solution, cationic, neutral, and anionic species are observed. On titration of an aqueous solution of acetato oxotriruthenium(III) acetate (pH=6.2) with solutions of sodium hydroxide and hydrochloric acid, a two proton protonation is observed with pK=4.35. This is in the region expected for water coordinated to ruthenium (III), and is so assigned. This result, together with the electrophoretic behaviour requires that the cationic and anionic species be univalent. The third aquo ligand does not deprotonate in the pH range covered by the tritration curve (1–12 pH), but the electronic spectrum of the complex undergoes a reversible change in more alkaline solutions, which is probably due to the loss of this proton and hence we obtain:

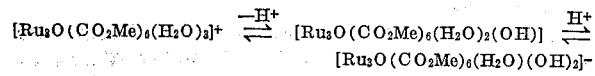

Treatment of methanolic solutions of the acetate with pyridine produces the blue complex, which may be precipitated from solutions with a number of anions, for example $ClO_4^-$, $BF_4^-$, $BPh_4^-$, or $PF_6^-$. From chilled solutions containing chloride ions, blue needle crystals are obtained.

Analysis of salts indicates the stoichiometry

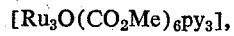

$(X=ClO_4^-, Cl^-)$. Paper electrophoresis experiments show this complex to be cationic, migrating at the same rate as the aquo complex itself; pH-titrations show no protonation or deprotonation in the range 1–12 pH, confirming that the behaviour described above is due to dissociation of the aquo ligands.

The perchlorate salt of the pyridine complex is also paramagnetic, with $\mu_{eff}=2.46$ B.M. (at 298°). The solubility in organic solvents increases on substitution of the aquo ligands by pyridine, and, of course, with increasing chain length of the carboxylate group in both cases.

The electronic absorption spectra given in Table 1 serve as guide for characterization of the species.

The Mond reaction: Hydrated ruthenium oxide dissolves in refluxing acetic acid quite rapidly. The electronic spectrum of the product varies with the mode of preparation of the oxide, probably with the water content. Chromatography of the green products (after removal of acetic acid) in methanol on alumina gave several bands but the main product had the same electronic spectrum as the product obtained on treating

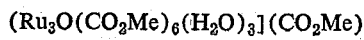

with glacial acetic acid. The latter was shown to be anionic in methanol and to be reconverted to the aquo acetate by water. Hence we have

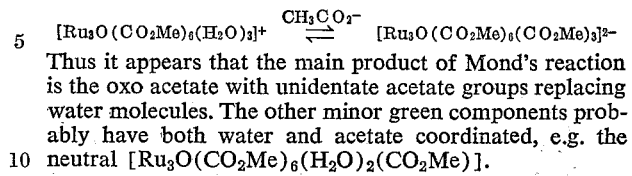

Thus it appears that the main product of Mond's reaction is the oxo acetate with unidentate acetate groups replacing water molecules. The other minor green components probably have both water and acetate coordinated, e.g. the neutral $[Ru_3O(CO_2Me)_6(H_2O)_2(CO_2Me)]$.

(2) Attempts to synthesize the trifluoroacetate

The synthetic procedure fails for trifluoroacetate, probably due to the much greater strength of $CF_3COOH$, which possibly prevents the formation of species with Ru—OH—Ru bridges and which, presumably, are intermediates in the formation of the $Ru_3O$ types. Using neutral or almost neutral solutions gives green or yellow solutions whose electronic spectra are quite different from those of the $Ru_3O$ species.

Other methods have also failed. On refluxing hydrated ruthenium oxide with trifluoroacetic acid no reaction occurs in two hours whereas acetic acid has almost completely dissolved the oxide in this time. On prolonged refluxing (several days) or in sealed tubes at 120°–160°, green solutions are obtained but the electronic spectra are not those of $Ru_3O$ species.

The interaction of a carboxylic acid and its anhydride on "$RuCl_3 n.H_2O$" which produces in addition to

considerable amounts of the green oxo species, fails for trifluoroacetic acid and there is no apparent reaction, the trichloride remaining undissolved.

Finally, the exchange of acetate and trifluoroacetate also fails. There is no change for up to 48 hours on refluxing the oxo acetate in trifluoroacetic acid (even pure acid) as judged by the proton resonance spectrum (although the oxoacetate is paramagnetic a methyl resonance can be observed at $\tau$ 7.70—see Table 2 which shows the proton resonance spectra of ruthenium carboxylates. On refluxing the oxo acetate with sodium trifluoroacetate and trifluoroacetic acid in ethanol (as in the synthesis of the oxo acetate) only partial exchange occurs. Conversion of the product to the pyridine and triphenylphosphine complexes, which could be isolated, showed that only ca. 50% of the $CO_2Me$ groups were replaced by $CO_2CF_3$ groups and this was confirmed also by 'H and Fn.M.r. (Hydrogen and fluorine nuclear magnetic resonance) spectra. No further exchange occurred on refluxing the product with fresh trifluoroacetic mixture.

(B) REDUCTION OF $\mu_3$-OXOTRIRUTHENIUM CARBOXYLATES

(1) Reduction by hydrogen

The acetate $[Ru_3O(CO_2Me)_6(H_2O)_3]$ $(CO_2Me)$, in water or methanol, is readily reduced by hydrogen at 2 atm. pressure at 25° using platinum oxide catalyst, first to a light green and then to a yellow solution. In methanol the first stage takes ca. 1 hr. and the second, ca. 3 hr. The yellow methanol solution slowly gives a yellow precipitate. In water the first stage takes ca. 4 hr. and the solution throws down a light green complex which is very insoluble in water, so that reduction of the latter to the yellow complex, which is also insoluble, takes about 24 hr.

The light green and yellow complexes are hence readily isolated due to their different solubilities in water and methanol. Analysis of the yellow complex made in water indicates the composition $[Ru_3(CO_2Me)_6(H_2O)_3]$, whereas from methanol it is $[Ru_3(CO_2Me)_6(MeOH)_3]$; the presence of methanol or water is readily shown by appropriate differences in the infra-red spectra (aquo species, 3500, 3480 s. (s.=strong), cm.$^{-1}$ (br.=broad); methanolate, 3400 w. (w.=weak), br., 996 (sharp Me rock)

cm.$^{-1}$). Evidence for the lack of the central oxygen atom is given below. The yellow species in solution react instantly with oxygen to give the light green complex, which is in turn more slowly oxidized to the starting green oxo acetate on standing. This redox cycle has been repeated three times without evidence of decomposition. The yellow and green solids are also air-sensitive but may be stored in sealed ampoules under nitrogen.

The green complex, which analyses as

$$[Ru_3O(CO_2Me)_6(H_2O)_3]$$

is diamagnetic, but the yellow complex is weakly paramagnetic with $\mu_{eff}$ ca. 0.4 BM per Ru$_3$ at 298° K.

The blue pyridine complex [Ru$_3$O(CO$_2$Me)$_6$py$_3$]$^+$ is similarly reduced but more rapidly. The yellow end product in solution is again rapidly oxidised by air first to a light green intermediate and then very slowly (several hours) to the blue starting material. The triphenylphosphine complex [Ru$_3$O(CO$_2$Me)$_6$(PPh$_3$)$_3$] is not reduced in methanol. The aquo or pyridine complexes with other carboxylic acids undergo similar redox processes as shown in the reaction of oxotriruthenium complexes given in FIG. 1.

Electrochemical studies discussed later show that the first stage is a one-electron and the second stage a further two-electron reduction. The reversibility shows that the trimer structure is always retained. Infra-red and n.M.r. (nuclear magnetic resonance) spectra of the light green and yellow complexes show no evidence for Ru-H bonds and only a single methyl resonance is observed. Solution electrophoresis on the light green aquo and pyridine complexes in aqueous acidic (to suppress ionisation of coordinated water) or methanolic media show that both species are neutral. Considering also the electrochemical reversibility of the first stage reduction, this then is evidently

[Ru$_3$O(CO$_2$R)$_6$L$_3$]$^+$+$e$
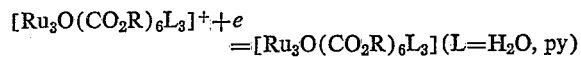
= [Ru$_3$O(CO$_2$R)$_6$L$_3$] (L=H$_2$O, py)

The light green complexes are hence the counterparts of the diamagnetic trimer Ru$_3$O(CO$_2$Me)$_6$(PPh$_3$)$_3$ and have the ruthenium atoms in a mean oxidation state 2⅔.

If the oxi-centers structure were preserved on the further 2-electron reduction to the yellow species, the latter would, inescapably, have to be a dianion. Although the yellow form of the acetate is anionic in neutral and alkaline aqueous solution, we have shown by solution electrophoresis, that this is a result of dissociation of coordinated water. The species is neutral in acidic media and in neutral methanol but becomes anionic only in alkaline methanol solution. Further, the yellow pyridine complex is neutral irrespective of the solvent or acidity confirming that the behavior of the aquo species is due to ionization of coordinated water. The yellow pyridine complex was readily isolated from reduction of strong solutions of [Ru$_3$O(CO$_2$Me)$_6$py$_3$] Cl in methanol; the precipitate can be recrystallized from petroleum-benzene. Molecular weight determinations on different samples gave a mean value of 860 with a maximum deviation of 8% from the value of 894 calculated for [Ru$_3$(CO$_3$Me)$_6$py$_3$]. Repetition of analyses and molecular weights using the 3-methylpyridine analogue were in agreement with this stoichiometry.

Hence, to maintain neutrality, the yellow complex can (a) gain two protons (b) lose two acetate ligands or (c) lose the central oxygen atom. Electrophoresis rules out (a) I.R. (infra-red) and N.M.R. spectra on the propionate (preferred to the acetate because of its higher solubility) are consistent only with the formulation

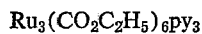
$$Ru_3(CO_2C_2H_5)_6py_3$$

as is analytical and molecular weight data which shows the trimer structure to be retained. Hence we conclude that the two-electron reduction requires removal of the central oxygen atom to give a trimer containing formally three, 5-coordinate ruthenium(II) atoms. This would account for the extreme sensitivity to oxygen—and the reformation of the oxo-centered light green III,III,II species on oxidation.

Positive proof for the re-insertion of a single oxygen atom into the yellow complex is as follows. The butyrate Ru$_3$(CO$_2$C$_3$H$_7$)$_6$py$_3$, which is very soluble in methanol, was prepared and treated with a stoichiometric amount of pyridine-N-oxide under rigorously oxygen-free conditions (where the yellow species was unaffected for several hours at least). Re-oxidation to the light green complex occurred within a few minutes and g.l.c. (gas-liquid chromotography) analysis confirmed the presence of pyridine. To eliminate any possibility of the formation of pyridine by dissociation or decomposition of the yellow pyridine complex, the experiment was repeated using pyridine-N-oxide to oxidize the 3-methyl pyridine butyrate. G.l.c. analysis showed that the expected amount of pyridine was formed:

[Ru$_3$(CO$_2$R)$_6$(Mepy)$_3$]+C$_5$H$_5$NO
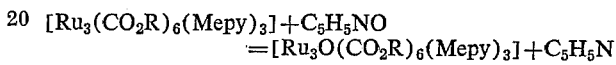
=[Ru$_3$O(CO$_2$R)$_6$(Mepy)$_3$]+C$_5$H$_5$N On exposure to the air the green solutions were re-oxidized to the blue [Ru$_3$O(CO$_2$R)$_6$py$_3$]+ complexes. Hence the complete reduction-oxidation sequence is:

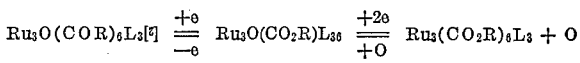

(2) Electrochemical reductions

The polarogram of [Ru$_3$O(CO$_2$Me)$_6$(H$_2$O)$_3$]+ in water using potassium chloride as base electrolyte was prepared. A cathodic wave occurs as E$^1$/2=−0.13 v. (versus S.C.E.) (standard calomel electrode) and the catalysed reduction of hydrogen ions commences at ca. −0.9 v. The height of the cathodic wave is linearly proportional to the concentration of the acetate, and to the square root of the height of the mercury reservoir (corrected for back pressure). The cyclic volt-ammogram of the cathodic wave was obtained in aqueous sodium fluoroborate solution, in which the anodic wave of mercury occurs at a more positive potential, permitting a suitable voltage range to be scanned. The voltammogram and the E$^3$/4–E$^1$/4 separation observed in the polarogram, both indicate a reversible one-electron reduction. Using the Heyrovsky-Ilkovick equation an n-value of 1.08 was obtained. This value was confirmed by coulometric reduction at the dropping mercury electrode and an n-value of 0.81 obtained. This low value lies outside the experimental error, and is attributed to a slow chemical reduction by the mercury pool accumulating from the electrode, as confirmed separately.

The reversibility of the couple is further confirmed by the polarogram of the partially electrochemically reduced solutions, which shows a composite reduction-oxidation wave. Confirmation of the identity of the electrochemically reduced solutions, which shows a composite reduction-oxidation wave. Confirmation of the identity of the electrochemically reduced species with those obtained by chemical reduction is provided by the exact similarity of the polarograms of species undergoing reduction by either method; controlled potential electrolysis at the dropping mercury electrode produces the light green intermediate.

The second stage of the reduction, producing the yellow species cannot be investigated electrochemically for oxo-triruthenium(III) acetate, because of the catalytic reduc- of the solvent. The pyridine complex, which is soluble in a wider range of solvents than the aquo form, was therefore studied. The polarograms in methanol, acetone, sulpholane, dimethylsulphoxide and dimethylformamide showed a cathodic wave in all cases similar to that of the aquo-form, and occurring at ca. −0.1 to −0.2 v. In methanol, the second reduction is again obscured by reduction of the solvent, but this wave may be observed in aprotic solvents; the best results being obtained in acetone, using sodium perchlorate as supporting electrolyte.

The first cathodic wave occurred at $E^1/2 = -0.20$ v. (vs. S.C.E.) and a second cathodic wave as seen at $E^1/2 = -1.36$ v. Reduction of the solvent begins at ca. $-1.85$ v. Cyclic voltammetry shows that the wave at $-0.20$ v. is reversible, but that the second wave at $-1.36$ v. is irreversible. Use of the Heyrovsky-Ilkovick equation gives an n-value of 0.96. Controlled potential electrolysis at $-0.4$ v. (versus aqueous S.C.E.) produces the light green intermediate, and at $-1.5$ v., the yellow form is obtained. Coulometric reduction on mercury electrodes is not possible owing to reaction of the complex with mercury, but reduction at $-0.4$ v. (versus aqueous S.C.E.) on platinum electrodes, gave n-values of 0.91 and 0.99, confirming that the first cathodic wave is again a one-electron process. From the ratio of the heights of the two waves, the second wave arises from a two-electron process.

The polarograms of aquo and pyridine oxotriruthenium(III) propionate and n-butyrate, are analogous to those of the acetate. The potentials of the various reductions are summarized in Table 3.

The thermodynamic reversibility of the first reduction wave of those complexes may be expected, as the electrode reaction involves only a simple one-electron transfer. The loss of the central oxygen atom on reduction to the second stage clearly accounts for the lack of thermodynamic reversibility for this process.

The triphenylphosphine complexes of acetate, propionate, and n-butyrate, which are in the same oxidation state ($2^2/3$) as the first reduced species of the corresponding aquo and pyridine adducts, also undergo a two-electron reduction at potentials of ca. $-1.1$ v. (various S.C.E.). However, these reductions are not simple and evidently lead to break up of the trimeric cluster. The difference of more than one volt in the two reduction potentials of the acetate accounts for the ready formation potentials of the acetate accounts for the ready formation of the complex $Ru_3O(CO_2R)_6(PPh_3)_3$, since the first reduction is well within the reducing power of the phosphine although the reduction is slow and takes several hours. It is noteworthy that in contrast to the slow reduction of $[Ru_3O(CO_2R)_6(H_2O)_3]+$ by $PPh_3$, the interaction of $PPh_3$ with the light green species

$[Ru_3O(CO_3R)_6(H_2O)_3]$ in methanol is rapid (a few minutes) since it merely involves ligand replacement.

(C) THE NATURE OF MARTIN'S ACETATE

It is now clear that Martin's acetate cannot have the oxo-centered structure. This complex is difficult to study as it is insoluble in most solvents. It is slightly soluble in water, but the solutions decompose rather quickly and even the solid decomposes on standing. Analysis supports a ratio $Ru:CO_2Me=1:2$ but analysis of the pyridine adduct, isolated as $ClO_4^-$ or $BF^-$ salts supports an approximate stoichiometry $\{[Ru_2(CO_2Me)_2py_4]X\}_n$

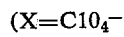
$(X = ClO_4^-$ $BF_4^-)$. Determination of the oxidation state of the ruthenium atoms in Martin's complex by the original method confirms the formulation as ruthenium (III), but the accuracy of the method is too low to exclude the possibility of non-integral oxidation states. The Martin complex is weakly paramagnetic, showing a moment of ca. 0.6–0.7 B.M. per ruthenium atom (Gouy method). The pyridine adduct (perchlorate salt) is diamagnetic. Martin's complex is reduced in water by hydrogen at two atmospheres on platinum to a dark green, and then to a yellow species, the latter stage being accompanied by the formation of much ruthenium metal. The reduction is not reversible on exposure to air.

The above behavior suggests that Martin's complex may be polymeric containing mainly ruthenium(III), which is reduced via mixed oxidation state complexes. If this is so, the pyridine adduct probably arises via bridge-splitting but on the available evidence, no satisfactory formulation can be given.

TRIS(AQUO)HEXA-$\mu$-ACETATO-$\mu_3$-OXOTRIRUTHENIUM(III, III, III)ACETATE

The green complex may be prepared according to the original method. After 4 hr. reflux, the dark green reaction mixture was cooled at ($-40°$) for 2 hr., and the precipitate of sodium chloride and sodium acetate was removed. The filtrate was evaporated on a rotary evaporator, dissolved in methanol, filtered, and again evaporated. The resulting solid was dried (12 hr.) in vacuo over sodium hydroxide pellets, to give the crude acetate in almost quantitative yield based on ruthenium content but containing about 15% of sodium acetate. This product may be used directly for preparative purposes. The pure acetate was obtained by two recrystallizations from methanol-acetone, the complex separating as a green powder on cooling to $-40°$.

TRIS(PYRIDINE)HEXA-$\mu$-ACETATO-$\mu_3$-OXOTRIRUTHENIUM(III) PERCHLORATE

To crude oxotriruthenium(III) acetate (0.5 g.) in methanol (5 ml.) was added pyridine (2 ml.). The solution was heated for 5 min. on steam, the color changing from dark green to dark blue. After cooling to room temperature, sodium perchlorate monohydrate (0.125 g.) in methanol (2 ml.) was added, the blue precipitated complex collected, washed with methanol, and dried in vacuo over silica gel. 0.32 g. (55%, based on Ru content of crude acetate). Addition of lithium chloride in methanol produces the chloride salt in similar yield.

TRIS(TRIPHENYLPHOSPHINE)HEXA-$\mu$-ACETATO-$\mu_3$-OXOTRIRUTHENIUM(II, III, III)

Triphenylphosphine (1.1 g.) in warm methanol (25 ml.) was added under nitrogen to crude oxotriruthenium (III) acetate (0.5 g.) in methanol (5 ml.) and the mixture was stirred overnight. After removal of the methanol, the residue was dissolved in benzene, and the solution was filtered. Ethanol (ca. 5 vols.) was added to the filtrate, which was then stored at 7° to yield light green crystals of the complex which were collected, washed with ethanol and then ether, and dried in vacuo over silica gel. 0.45% g. (55% based on Ru content of crude acetate).

OXOTRIRUTHENIUM(III) PROPIONATE AND ITS PYRIDINE AND TRIPHENYLPHOSPHINE DERIVATIVES

Sodium hydroxide (0.59 g.) was dissolved by warming in a mixture of ethanol (25 ml.), was propionic acid (26 ml.). To the resulting solution was added (at room temperature), ruthenium trichloride trihydrate (1 g.), and the mixture was refluxed under nitrogen for 4 hr. The solution was cooled at $-40°$ for 2 hr., filtered, and evaporated on a rotary evaporator. The residue was dried in vacuo over sodium hydroxide overnight. The resulting crude aquo oxotrirutheinum(III) propionate was dissolved in methanol (15 ml.) and the solution was filtered and divided in three parts.

(a) TRIS AQUO-HEXA-$\mu$-ACETATO-$\mu_3$-OXOTRIRUTHENIUM(III) PROPIONATE

To the methanolic solution (5 ml.) was added a large excess of diethyl ether, and the solution was stored at $-40°$. After one week, dark green, almost black crystals of the complex had formed. These were collected, washed with ether, and dried in vacuo over silica gel. 0.06 g.

(b) TRIS(PYRIDINE)HEXA-µ-PROPIONATE-µ₃-OXOTRIRUTHENIUM(III) PERCHLORATE

To the methanolic solution (5 ml.) was added pyridine (2 ml.) and the solution was stirred for 1 hr. Sodium perchlorate monohydrate (0.1 g.) in methanol (1 ml.) was added and the solution was left for 1 hr. at −40°. The blue crystalline complex was collected, washed with diethyl ether, and dried in vacuo over silica gel, 0.22 g.

(c) TRIS(TRIPHENYLPHOSPHINE)HEXA-µ-PROPIONATE-µ₃-OXOTRIRUTHENIUM(II, III, III)

To the methanolic solution (5 ml.) was added triphenylphosphine (0.5 g.) and the solution was stirred overnight under nitrogen. The resulting solution was cooled at −40° for 4 hr., and filtered. The precipitate was washed with ether, then dissolved in benzene and again filtered. Ethanol (ca. 5 vols.) was added to the filtrate, which was left at −40° overnight. The light green crystals were collected, washed with ethanol and dried in vacuo over silica gel, 0.2 g.

OXOTRIRUTHENIUM(III) N-BUTYRATE AND ITS PYRIDINE AND TRIPHENYLPHOSPHINE DERIVATIVES

The n-butyrate was prepared as for the propionate. The crude product, after drying, was dissolved in methanol as before. Tris(aquo)-hexa-µ-n-butyrato-µ₃-oxotriruthenium(III) n-butyrate could not be isolated in solid form, but the crystalline derivatives were readily obtained.

TRIS(PYRIDINE)HEXA-µ-N-BUTYRATO-µ₃-OXOTRIRUTHENIUM(III) PERCHLORATE

This complex was prepared as for the propionate, except that ethanol was used as solvent. After the reaction mixture had been stirred for 1 hr. sodium perchlorate monohydrate (0.2 g.) was dissolved in the solution. Petroleum (60–80°) was added, and the solution was stored at −40°. After ca. 3 hr., the blue crystals of the complex which formed were collected, washed with petroleum and dried in vacuo over silica gel, 0.21 g.

TRIS(TRIPHENYLPHOSPHINE)HEXA-µ-N-BUTYRATO-µ₃-OXOTRIRUTHENIUM(II,III,III)

This complex was prepared and purified as for the propionate analogue, 0.11 g.

REDUCTION OF OXOTRIRUTHENIUM(III) ACETATE

Reductions were carried out in glass pressure bottles (Fisher and Porter 8 oz. Compatibility Bottles) at two atmospheres pressure, using Adams' catalyst ($PtO_2$). Water or methanol was used as solvent. Where used, commercial "White Spot" nitrogen was purified by passage through chromium(II) solutions.

(a) TRIS(AQUO)-HEXA-µ-ACETATO-µ₃-OXOTRIRUTHENIUM(II,III,III)

Crude oxotriruthenium(III) acetate (1.5 g.) in water (10 ml.) was stirred under hydrogen (2 atmospheres) in presence of catalyst (ca. 3–5 mg.) The dark green solution became light green. The precipitate, formed after ca. 4 hr., was transferred under nitrogen to a centrifuge tube, centrifuged, and the supernatant liquid discarded. The product was then stirred with deoxygenated water, centrifuged, and the supernatant liquid was again discarded. The product was dried on a vacuum line, to yield the complex as a light green powder. The dry solid was stored in sealed ampoules under nitrogen. It is slowly re-oxidized to the starting material by air. The complex is insoluble in most solvents.

(b) TRIS(AQUO)HEXA-µ-ACETATO TRIRUTHENIUM(II)

Crude oxotriruthenium(III) acetate (0.5 g.) in water (5 ml.) was stirred under hydrogen (2 atm.) in presence of Adams' catalyst (35 mg.) for 2 days. The yellow precipitate which formed was collected, washed, dried and stored as for the light green reduced complex. The dry solid is oxidized fairly quickly in air. The complex is insoluble in most solvents.

(c) TRIS(METHANOL)HEXA-µ-ACETATO TRIRUTHENIUM(II)

This complex was prepared as for the aquo form, using methanol as solvent and for washing.

(d) TRIS(PYRIDINE)HEXA-µ-ACETATO TRIRUTHENIUM(II)

The complex [Ru₃O(CO₂Me)₆Py₃] Cl was reduced in methanol as described above for the aquo form. The yellow precipitate which formed was recrystallized (under deoxygenated nitrogen) from benzene-petroleum (60–80°). The resulting complex was washed with petroleum and dried in vacuum. It is soluble in alcohol and in benzene.

The yellow 3-methylpyridine complex

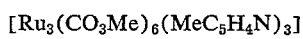

was prepared and recrystallized (twice) by the above methods.

Mond's reaction

Hydrated ruthenium oxide was prepared by addition of strong aqueous solutions of sodium hydroxide to ruthenium trichloride trihydrate in 4 N hydrochloric acid. The resulting black precipitate was washed until alkali-free with water.

On refluxing the resulting wet oxide with glacial acetic acid for 2 hrs., most of the oxide dissolved to give a green solution. After removal of acid and immediate chromatography on alumina, using methanol, the electronic spectrum of the main band indicated that it was

When the wet oxide was washed with methanol and ether, and dried in vacuo before refluxing with acetic acid, chromatography of the resulting green solutions produced diffuse bands, showing absorption maxima in the region 620–700 nm. No species similar to [Ru₃O(O₂CMe)₉]²⁻ were obtained.

OXIDATIONS OF THE YELLOW COMPLEXES WITH PYRIDINE-N-OXIDE

All operations (except reductions) were carried out under argon, which was purified by passage through two Dreschel baths of chromium(II) solution, two of concentrated sulphuric acid, and two of methanol. Hydrogen (at one atmosphere) was passed through one Dreschel bottle of chromium(II) and one of methanol.

Pyridine-N-oxide (British Drug Houses) was purified as follows. The solid (5 g.) was placed in a cold-finger type sublimation apparatus, which was connected to a vacuum line. With continuous pumping, the lower portion of the apparatus was heated in an oil-bath to 160°. When the melt ceased to boil, the apparatus was removed from the vacuum line and allowed to cool. The condensing surface of the cold-finger was cleaned, and the apparatus was then returned to the vacuum line. Dry Ice-acetone mixture was placed in the cold finger, and the apparatus was again heated in an oil-bath, with continuous pumping to ca. 160°. Pure pyridine-N-oxide collected on the condensing surface as a white crystalline deposit. When sufficient had collected, the apparatus was allowed to cool, and air was then admitted. The pure product is quite hygroscopic, and was stored in a desiccator, over silica-gel. Tris(3 - methylpyridine)hexa-$\mu$-n-butyrato-$\mu_3$-oxotriruthenium(III) perchlorate (0.3 g.) in methanol (4 ml.) was placed in a 25 ml. conical flask containing $PtO_2$ (ca. 10 mg.) The flask was swept with argon and then hydrogen was passed until the complex was reduced to the yellow species (24 hrs.). Argon was passed through a solution of pyridine-N-oxide (0.025 g.) in methanol (2 ml.) contained in a 10 ml. "Quickfit" flask. After 1 hr., the exit tube from the flask containing pyridine-N-oxide was inserted into the flask containing the ruthenium solution. The hydrogen inlet tube was then removed from the latter flask. Argon was thus passed first through the pyridine-N-oxide solution and then through the ruthenium solution. No oxidation of the latter solution had occurred after 30 min., indicating that no oxygen was present in the system. The exit tube from the 10 ml. flask was then inserted into the pyridine-N-oxide solution, which was then forced over into the ruthenium solution. The latter solution was greenish yellow within 1 min., and green in ca. 5 min. After 1 hr., g.l.c. analysis of the reaction mixture showed the presence of pyridine, the amount of pyridine being within 10% of that expected. On exposure to air, the green solution was oxidized back to the blue starting material which was recovered. G.l.c. analysis on the pyridine-N-oxide, on both the initial ruthenium complex, and an air-oxidized solution of the yellow species, showed that pyridine was not arising from these sources. The entire experiment was repeated, with identical results.

Electrophoresis and pH titrations

High voltage paper electrophoresis was carried out at 2 or 4 kv. (50 or 100 v./cm). Solution electrophoresis was as 120 v. (10 v./cm.). Formic acid-acetic acid buffer (25 and 75 ml. per litre respectively, pH 1.8) and sodium borate buffer (0.05 M, pH 9.2) were used for acidic and alkaline experiments. On experiments with the reduced forms, solution electrophoresis was carried out under nitrogen, purified by chromium(II) solutions.

For pH titrations, solution of concentration $2 \times 10^{-3}$ M were titrated with standardized 1 M sodium hydroxide or hydrochloric acid solutions. A micropipette was used, the internal volume of which had been determined by calibration with mercury.

Titrations were performed at 25° under nitrogen, which was purified by passage through Dreschel bottles of chromium(II) (oxygen removal) and potassium hydroxide (carbon dioxide removal) solutions, and then through water.

TABLE 1

Electronic absorption spectra of ruthenium carboxylates

| Complex | Spectrum [$\lambda$nm, $v$] |
|---|---|
| $[Ru_3O(O_2CR)_6(H_2O)_3]^+$: [a] | |
| Acetate | 686(1,100); 629(1,000); 391sh (ca. 1,250). |
| Acetate (Mond)[b] | ca. 720sh; 614; ca. 530sh; 366. |
| Acetate (from acetic acid)[b] | ca. 720sh; 610; ca. 530sh; 366. |
| Propionate | 672(880); 617(810); 370sh (ca. 1,180). |
| n-Butyrate | 674; 168; 375sh. |
| Benzoate | 686; 633; 386sh. |
| 2-ethylhexanoate | 676; 613; 388sh. |
| n-Octoate | 672; 619; 385sh. |
| $[Ru_3O(O_2CR)_6py_3]^+$: [a] | |
| Acetate | 686(4,280); ca. 620sh; ca. 500sh; 312(8,450). |
| Propionate | 686(5,280); ca. 620sh; ca. 500sh; 309(12,900). |
| n-Butyrate | 686(4,690); ca. 620sh; ca. 500sh; 304(10,900). |
| $[Ru_3O(O_2CR)_6(PPh_3)_3]$: [c] | |
| Acetate | 974(6,280); ca. 790sh; ca. 410sh; 347(11,900). |
| Propionate | 974(6,630); ca. 790sh; ca. 410sh; 343(12,000). |
| n-Butyrate | 974(5,060); ca. 790sh; ca. 410sh; 338(12,200). |
| $[Ru_3O(O_2CMe)_6(H_2O)_3]$ [a] | 847(1,620); 409(1,170). |
| $Ru_3(O_2CMe)_6(H_2O)_3$ [a] | 850(2,100); 391(1,250). |
| $[Ru_3O(O_2CMe)_6py_3]$ [a] | 890(7,290); 382(9,000). |
| $[Ru_3(O_3CMe)_6py_3]$ [a] | 893(8,630); 382(9,680). |

[a] In methanol.
[b] Made in glacial acetic acid, measured in methanol.
[c] In chloroform.

NOTE.—ca.=approximately; sh=shoulder.

TABLE 2

Proton resonance spectra of ruthenium carboxylates—($\tau$ values at 100 mHz. relative to benzene as external reference)

| Complex | py or $PPh_3$ | Carboxylate |
|---|---|---|
| $Ru_3O(O_2CMe)_6(H_2O)_3]^+$ [a] | | 7.70s. |
| $Ru_3O(O_2CMe)_6py_3]^+$ [b] | 3.57, 4.09 broad | 5.55s. |
| $Ru_3O(O_2CMe)_6(PPh_3)_3$ [c] | 1.59, 1.98, broad | 7.97s. |
| $Ru_3(O_2CEt)_6py_3$ [b] | −2.12, −0.22, broad | 7.01 quartet; 8,60 triplet. |

[a] $D_2O$ solution.
[b] $CDCl_3$ solution.
[c] $C_6D_6$ solution.

NOTE.—s=singlet.

TABLE 3

Heat-wave potentials for reduction of ruthenium carboxylates (relative to external aqueous S.C.E.) (standard calomel electrode)

| Complex | First wave (v.) | Second wave (v.) |
|---|---|---|
| $[Ru_3O(O_2CR)_6(H_2O)_3]^+$: [a] | | |
| Acetate | −0.19 | |
| Propionate | −0.24 | |
| n-Butyrate | −0.24 | |
| Benzoate | −0.14 | |
| 2-ethylhexanoate | −0.35 | |
| n-Octoate | −0.30 | |
| $[Ru_3O(O_2CR)_6py_3]^+$: [b] | | |
| Acetate | −0.20 | −1.36 |
| Propionate | −0.24 | −1.47 |
| n-Butyrate | −0.21 | −1.45 |
| $[Ru_3O(O_2CR)_6(PPh_3)_3]$: [b] | | |
| Acetate | | −1.05 |
| Propionate | | −1.07 |
| n-Butyrate | | −1.10 |
| Thallium (I) [a] | −0.35 v. | |
| Do | −0.36 v. | |

[a] In 0.1M sodium perchlorate in methanol.
[b] In 0.1M sodium perchlorate in acetone.

TABLE 4

Analytical Data for Ruthenium Carboxylato Complexes

| Complex | Found | | | | | Required | | | | |
|---|---|---|---|---|---|---|---|---|---|---|
| | C | H | N | Cl/P | Ru | C | H | N | Cl/P | Ru |
| $[Ru_3O(CO_2Me)_6(H_2O)_3]CO_2Me$ | 22.2 | 3.4 | | | 39.4 | 21.4 | 3.4 | | | 38.8 |
| $[Ru_3O(CO_2Me)_6py_3]ClO_4$ | 32.0 | 3.4 | 4.0 | 3.4 | | 32.0 | 3.3 | 41. | 3.5 | |
| $[Ru_3O(CO_2Me)_6(PPh_3)_3]$ [a] | 55.0 | 4.5 | | 6.0 | 20.1 | 54.2 | 4.5 | | 6.5 | 20.6 |
| $[Ru_3(CO_2Me)_6(H_2O)_3]$ | 19.4 | 3.2 | | | 41.6 | 19.7 | 3.3 | | | 41.8 |
| $[Ru_3O(CO_2Me)_6(H_2O)_3]$—Comparative | 19.9 | 3.4 | | | | 20.2 | 3.4 | | | |
| $[Ru_3(CO_2Me)_6(MeOH)_3]$—Comparative | 24.3 | 3.5 | | | | 24.0 | 3.6 | | | |
| $Ru_3(CO_2Me)_6py_3$ [b]—Comparative | 35.7 | 3.8 | 4.5 | | | 36.2 | 3.7 | 4.7 | | |
| $[Ru_3O(CO_2Me)_6(Mepy)_3]$ [c]—Comparative | | | | | | | | | | |
| $[Ru_3O(CO_2Et)_6(H_2O)_3]CO_2Et$ | 27.3 | 4.3 | | | | 28.7 | 4.7 | | | |
| $[Ru_3O(CO_2Et)_6py_3]ClO_4$ | 36.0 | 4.0 | 3.8 | 3.3 | | 36.1 | 4.1 | 3.8 | 3.2 | |
| $[Ru_3O(CO_2Et)_6(PPh_3)_3]$ | 57.2 | 5.3 | | 6.0 | | 57.7 | 5.0 | | 6.2 | |
| $[Ru_3O(CO_2Pr)_6py_3]ClO_4$ | 39.6 | 4.9 | 3.3 | 3.1 | | 39.6 | 4.9 | 3.5 | 3.0 | |
| $[Ru_3O(CO_2Pr)_6(PPh_3)_3]$ | 56.7 | 5.9 | | 6.1 | | 57.3 | 5.4 | | 5.7 | |

[a] M=1,420 (benzene); M required 1.459.
[b] M=(methanol), (i) 870, 855 (ii) 825, 875, M required, 894.
[c] M=(methanol) 975, 910; M required, 939.

Figure 1. Reactions of Oxotriruthenium Complexes

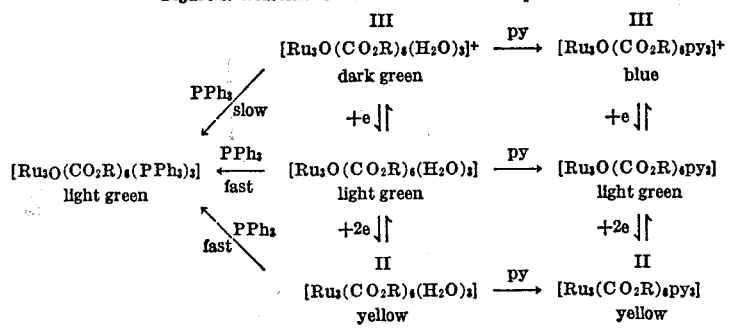

What I claim is:

1. A composition of matter comprising a cation of the formula:

$$M^1M^2M^3XAn_6L^1L^2L^3$$

where $M^1$, $M^2$ and $M^3$ are ruthenium atoms having a formula oxidation state of +2 or +3, X is oxygen, An is a carboxylate anion having the general formula:

(OCOR)

in which R is selected from the group consisting of alkyl and aryl radicals, $L^1$, $L^2$ and $L^3$ are selected from the group consisting of water, pyridine, hydroxyl, triphenylphosphine, carbonyl, methanol, methylpyridine, and carboxylate as defined above and an anion selected from the group consisting of perchlorate, fluoroborate, tetraphenylborate, fluorophosphate, chloride and carboxylate (OCOR)

wherein R is selected from the group consisting of alkyl and aryl.

2. A composition of matter comprising an anion of the formula:

$$M^1M^2M^3XAn_6L^1L^2L^3$$

where $M^1$, $M^2$ and $M^3$ are ruthenium atoms having a formal oxidation state of +2 or +3, X is oxygen, An is a carboxylate anion having the general formula:

OCOR in which R is selected from the group consisting of alkyl and aryl radicals, $L^1$, $L^2$ and $L^3$ are selected from the group consisting of water, pyridine, hydroxyl, triphenylphosphine, carbonyl, methanol, methylpyridine, and carboxylate as defined and having $Na^+$ as cation.

3. A composition according to claim 1 in which the carboxylate is selected from the group consisting of acetate, propionate, butyrate, benzoate, 2-ethylhexanoate and octoate.

4. A composition according to claim 2 in which the ruthenium atoms are present as $[ORu_3III,II,II]^{5+}$ 5. A composition according to claim 2 having the formula $[Ru_3O(OCOCH_3)_6(H_2O)_3]^-$ 6. A composition according to claim 2 having the formula $[Ru_3O(OCOCH_3)_6(PPh)_3]^-$ 7. A composition according to claim 2 having the formula $[Ru_3O(CO_2Me)_6(H_2O)(OH)_2]^-$

References Cited

Legzdins et al.: J. Chem. Soc. (A), 1970, pp. 3322–3326.

PATRICK P. GARVIN, Primary Examiner

A. P. DEMERS, Assistant Examiner

U.S. Cl. X.R.

252—431 C, 431 N, 431 P; 260—270 R; 423—417, 544, 592